United States Patent
Higashi et al.

(10) Patent No.: US 6,818,302 B2
(45) Date of Patent: Nov. 16, 2004

(54) LAMINATE

(75) Inventors: Kenichi Higashi, Sodegaura (JP); Yousuke Tsukuda, Niihama (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/233,410

(22) Filed: Sep. 4, 2002

(65) Prior Publication Data
US 2003/0072956 A1 Apr. 17, 2003

(30) Foreign Application Priority Data
Sep. 7, 2001 (JP) ........................................ 2001-271622

(51) Int. Cl.⁷ ................................................ B32B 9/04
(52) U.S. Cl. ................................ 428/411.1; 264/176.1; 264/219; 428/412; 258/196
(58) Field of Search .............................. 264/176.1, 219; 428/411.1; 528/196

(56) References Cited

U.S. PATENT DOCUMENTS 5,174,848 A * 12/1992 Yazaki et al. ............... 156/242
5,445,883 A * 8/1995 Kobayashi et al. ... 428/355 EN
6,294,268 B1 * 9/2001 Muraoka et al. ............ 428/515

FOREIGN PATENT DOCUMENTS

| JP | 10-86301 A | 4/1998 |
| JP | 10-100329 A | 4/1998 |
| JP | 10-138415 A | 5/1998 |
| JP | 11-207896 A | 8/1999 |
| JP | 11-207898 A | 8/1999 |
| JP | 11-207899 A | 8/1999 |

* cited by examiner

*Primary Examiner*—Terressa Boykin
(74) *Attorney, Agent, or Firm*—Sughrue Mion, PLLC

(57) ABSTRACT

Disclosed is a laminate comprising at least:
  a resin layer (A) containing a propylene-based resin (a);
  a resin layer (B) containing a thermoplastic resin (b) with a tensile elongation at break of not less than 100%; and
  a resin layer (C) containing an acrylic resin (c), wherein the resin layer (A),
  the resin layer (B) and the resin layer (C) are disposed in layers in this order.

24 Claims, 1 Drawing Sheet

LAMINATE

BACKGROUND OF THE INVENTION

1. Field of the Invention

The present invention relates to a laminate comprising an acrylic resin layer, a thermoplastic resin layer and a propylene-based resin layer, to a structure comprising the laminate and a polypropylene resin substrate, and to an automotive part and a part of household appliances, the parts comprising the foregoing structure.

2. Description of the Prior Art

To produce a molded resin article of good design property by preforming a decorative or colored film by vacuum forming or the like, inserting the film preformed into a mold for injection molding, thereafter injecting a synthetic resin to allow the decorative or colored film to laminate to a part of the surface of the resulting molded article has recently been proposed as a method for improving the design property of the surface of a molded article without performing painting. For instance, Japanese Patent Kohyo Publication No. 2-503077 and Japanese Patent Laid-Open 11-207896 disclose that a colored molded article is produced by use of a laminate constituted of a transparent layer, a colored layer and a substrate, as a paintless film.

Incidentally, in the case where a molded article of good design properties is produced by such a method, it is general to use a polyolefin resin such as polypropylene as a resin for injection molding which will form a substrate of the molded article. Further, it is important for a molded article to be excellent in scratch resistance, surface luster property, weather resistance and the like. Furthermore, it is required to produce such a molded article at low cost. Therefore, at present, adopted is a method comprising the steps of preforming a laminate comprising an acrylic resin layer as a transparent layer or a colored layer, a polypropylene resin layer as a substrate layer by thermoforming such as vacuum forming into a predetermined shape, inserting the resulting preformed laminate into a mold for injection molding, and injecting, after the insertion, a polyolefin resin. In the above method, the "substrate layer" indicates a layer in the laminate that will come in contact with an injection molding resin which will become a substrate.

However, it has become clear that such a conventional laminate may form cracks therein during its handling, for example, at the time of its setting for thermoforming or at its release from a mold after its forming. Such cracking will become a serious problem because it will deteriorate the appearance of a structure after the injection of a polyolefin resin.

SUMMARY OF THE INVENTION

The present invention was made for the elimination of the above problem. The object of the present invention is to provide a laminate of good crack resistance wherein the laminate does not form cracks at the time of its setting during its thermoforming or of its release from a mold after its thermoforming.

The present invention provides a laminate comprising at least:

a resin layer (A) containing a propylene-based resin (a);
a resin layer (B) containing a thermoplastic resin (b) with a tensile elongation at break of not less than 100%; and
a resin layer (C) containing an acrylic resin (c), wherein the resin layer (A), the resin layer (B) and the resin layer (C) are disposed in layers in this order.

The present invention further provides a structure comprising the foregoing laminate and a substrate containing a polyolefin resin, the substrate being laminated to the resin layer (A) of the laminate. Furthermore, the present invention provides an automotive part and a household appliance part comprised of the foregoing laminate structure.

DETAILED DESCRIPTION OF PREFERRED EMBODIMENTS

Figure 1:
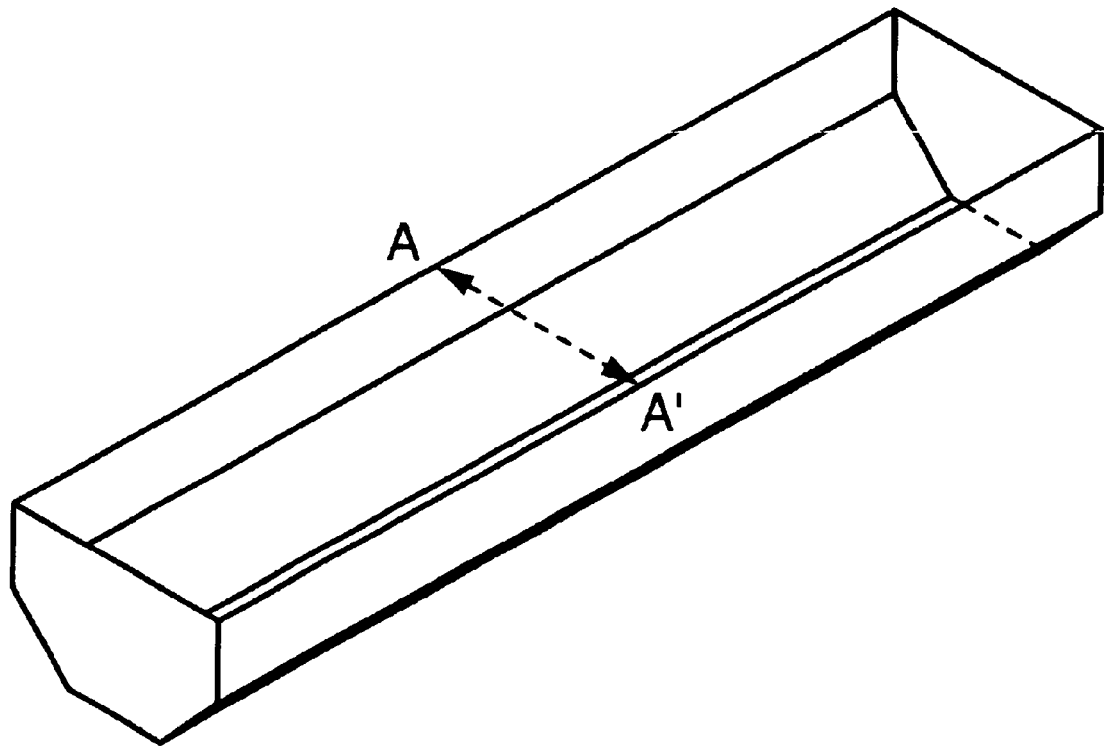
FIG. 1 is a perspective view showing the shape of a laminate (preformed article) of the present invention after shaping with a vacuum forming device.

First, explained is the propylene-based resin (a) to be employed for the resin layer (A) in the laminate of the present invention. The propylene-based resin (a) includes homopolymers of propylene; random or block copolymers of propylene and at least one monomer selected from the group consisting of α-olefins having at least four carbon atoms and other monomers (e.g., propylene-ethylene copolymers, propylene-butene-1 copolymers, propylene-ethylene-butene-1 terpolymers, and the like, provided that the repeating units derived from propylene are the main components); or mixtures of these polymers, mixtures of a propylene homopolymer and polyethylene, etc.

The α-olefin having four or more carbon atoms that can be copolymerized with propylene includes α-olefins having from 4 to 18 carbon atoms such as butene-1,4-methyl-pentene-1, hexene-1, octene-1, decene-1, and octadecene-1. A single kind or at least two kinds of α-olefins may be employed. Of the foregoing α-olefins, a propylene-ethylene random copolymer or a mixture of a propylene homopolymer and polyethylene is preferably employed. The method for preparing the propylene-based resin (a) is not particularly limited. It can be prepared, for example, by ion polymerization.

In order to prevent the laminate from curling during thermoforming thereof such as vacuum forming, it is desirable to use, for the resin layer (A), a propylene-based resin composition containing an inorganic filler and a thermoplastic elastomer in addition to the foregoing propylene-based resin (a). By "curling" is meant a phenomenon in which a preformed laminate which was preformed by vacuum forming or the like deforms (curls) with time.

The inorganic filler includes talc, calcium carbonate, mica, barium sulfate, calcium silicate, clay, magnesium carbonate, alumina, silica, glass fiber reinforcements and the like. Among them, talc is preferably used as the inorganic filler. The thermoplastic elastomer includes ethylene-propylene copolymers, ethylene-propylene-conjugated diene copolymers, ethylene-α-olefin copolymers, styrene-butadiene-styrene block copolymers, styrene-isoprene-styrene block copolymers and styrene-ethylene-butylene-styrene block copolymers. These may be used singly or in combination. Of them, ethylene-α-olefin copolymers are preferred.

When a propylene-based resin composition comprising a propylene resin (a), an inorganic filler and a thermoplastic elastomer is employed as the resin layer (A), the content of the propylene-based resin (a) is preferably from 10 to 98% by weight, more preferably from 15 to 80% by weight, and most preferably from 20 to 70% by weight. The content of the propylene-based resin (a) within the above range is favorable because the amount of components that may cause curling is a proper amount.

The content of the inorganic filler is preferably from 1 to 60% by weight, and more preferably from 10 to 50% by weight. The content of the thermoplastic elastomer is preferably from 1 to 60% by weight, and more preferably from 10 to 50% by weight. The content of the inorganic filler within the above range is favorable because shrinking of a laminate during or after its vacuum forming is inhibited. The content of the thermoplastic elastomer within the above range is favorable because shrinking of a laminate during or after its vacuum forming is inhibited and the rigidity of the resin layer (A) is reduced.

Further, the total amount of the inorganic filler and the thermoplastic elastomer is preferably from 30 to 80% by weight. The total amount of the inorganic filler and the thermoplastic elastomer within the above range is favorable in view of the shrinking of the laminate during and after its vacuum forming and the rigidity of the resin layer (A).

The method for preparing the resin layer (A) in the present invention is not particularly restricted. The resin layer (A) can be prepared, for example, by known extrusion T-die forming. The thickness of the resin layer (A) is not particularly limited, but it is preferably from 10 to 500 μm. The thickness can be measured with a micrometer. The resin layer (A) serves mainly as a substrate layer in the laminate.

Next, explained is the thermoplastic resin (b) in the resin layer (B) of the present invention. The thermoplastic resin (b) has a tensile elongation at break of not less than 100%, preferably not less than 110%, and more preferably not less than 120%. In the present invention, the higher the tensile elongation at break, the more desirable it is. The upper limit of the tensile elongation at break is not particularly limited. However, it is difficult to measure the tensile elongation at break of 500% or more by use of a measuring instrument conventionally employed.

From the viewpoint of whether a material is practically easy to obtain, the upper limit of the tensile elongation at break is about 100%. The measurement of the tensile elongation at break can be carried out according to the testing method for tensile properties of rigid plastics provided in JIS K-7113 (dimension of specimen: 12.3 mm×127 mm×3 mm; test temperature: 23° C.).

When the tensile elongation at break of the thermoplastic resin (b) falls within the above range, it is possible to provide a laminate that forms no cracks at the time of its setting for thermoforming such as vacuum forming or at the time of its release from a mold after its thermoforming. Further, letting the thermoplastic resin (B) in the resin layer (B) have a tensile elongation at break within the above range allows the formability of a preformed laminate to be improved. The formability indicates the degree of difference between the shape of the preformed laminate immediately after its thermoforming and the shape of the mold used for the thermoforming. When a preformed article having a shape exactly corresponding to that of the mold used for the thermoforming is obtained, the formability is best.

In the present invention, of the foregoing resins as the thermoplastic resins (b), polycarbonate resins are preferred. The kind of the polycarbonate resins is not particularly restricted, but is exemplified by polycarbonate resins obtained by the phosgene method in which various kinds of dihydroxydiaryl compounds are allowed to react with phosgene or a transesterification method in which a dihydroxydiaryl compound is allowed to react with a carbonic acid ester such as diphenyl carbonate, and typically by carbonate resins prepared from 2,2-bis(4-hydroxyphenyl)propane (bisphenol A).

The aforementioned dihydroxydiaryl compound includes, other than bisphenol A, bis(hydroxyaryl)alkanes such as bis(4-hydroxyphenyl)methane, 1,1-bis(4-hydroxyphenyl) ethane, 2,2-bis(4-hydroxyphenyl)butane, 2,2-bis(4-hydroxyphenyl)octane, bis(4-hydroxyphenyl) phenylmethane, 2,2-bis(4-hydroxyphenyl-3-methylphenyl) propane, 1,1-bis(4-hydroxy-3-tert-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyaryl) cycloalkanes such as 1,1-bis(4-hydroxyphenyl) cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'dihydroxydiphenyl sulfide; dihydroxydiaryl sulfoxides such as 4,4'-dihydroxydiphenyl sulfoxide and 4,4'-dihydroxy-3,3'-dimethyldiphenyl sulfoxide, dihydroxydiaryl sulfones such as 4,4'-dihydroxydiphenyl solfone and 4,4'-dihydroxy-3,3'-dimethyldiphenyl sulfone; etc.

These compounds are used singly or in combination of two or more of them. They may be used together with other compound(s) such as piperazine, dipiperidylhydroquinone, resorcin and 4,4'-dihydroxydiphenyl.

Further, the foregoing dihydroxyaryl compounds may be used together with a phenol compound having three or more hydroxyl groups such as those shown below.

The phenol compound having three or more hydroxyl groups includes phloroglucin, 4,6-dimethyl-2,4,6-tri-(4-hydroxyphenyl)-heptene, 2,4,6-trimethyl-2,4,6-tri-(4-hydroxyphenyl)-heptane, 1,3,5-tri-(4-hydroxyphenyl)-benzol, 1,1,1-tri-(4-hydrozyphenyl)-ethane and 2,2-bis-[4,4-(4,4'-dihydroxydiphenyl)-cyclohexyl]-propane.

The viscosity average molecular weight of the polycarbonate resin is usually from 10,000 to 100,000, preferably from 15,000 to 35,000. In the production of such polycarbonate resin, a molecular weight regulator, a catalyst or the like may be employed as required.

The resin layer (B) of the present invention is preferably a design layer such as a print layer and a colored layer and also may contain both a print layer and a colored layer as the design layer. When the resin layer (B) contains a colored layer, the thermoplastic resin (b) must contain a coloring agent. A coloring agent to be used in the present invention is not particularly restricted. Any of inorganic pigments and organic pigments may be employed. Examples of the coloring agent include carbon black, titanium oxide, kaolin clay, zinc flower, red iron oxide, Permanent Red, molybdenum orange, cobalt blue, ultramarine, Phthalocyanine Blue and manganese violet. These pigments may be used singly or may be used in combination of two or more of them. For letting the resin layer (B) have a metallic or pearl feeling, the thermoplastic resin (b) may contain an aluminum flake or a pearl pigment. Further, the thermoplastic resin (b) may contain a dye.

On the other hand, when the resin layer (B) contains a print layer, the method for forming the print layer has no particular limitations. The print layer can be formed by a known method. For example, gravure printing, screen printing and printing using an inkjet printer or the like utilizing computer graphic technology can be employed. There are no particular limitations about printing ink to be used. For example, a urethane-based ink, a vinyl acetate/acrylic ink, or an aqueous ink can be used.

Next, explained is the acrylic resin (c) in the resin layer (C) of the present invention. For example, resins mainly comprising polymers derived from acrylic acid, methacrylic acid or their esters can be used as the acrylic resin (c). Further, the acrylic resin (c) includes a resin composition containing an acrylic resin. Examples of the resin composition include resin compositions containing an acrylic resin and a fluororesin such as polyvinylidene fluoride and resin compositions containing an acrylic resin and an MS (methacryl-styrene) resin.

The acrylic resin (c) may be a (meth)acrylic resin that is obtained by modifying a polymer derived from acrylic acid, methacrylic acid or their esters and that contains from 3 to 30% by weight of 6-membered acid anhydride units represented by the following general formula [I] in the molecule.

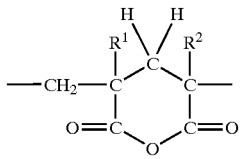

The ester of acrylic acid or methacrylic acid is exemplified by methyl acrylate, ethyl acrylate, methyl methacrylate, ethyl methacrylate, cyclohexyl methacrylate and benzyl methacrylate. These may be used as a mixture.

The 6-membered acid anhydride units represented by general formula [I] can be obtained by heat-treating to modify the above-mentioned polymer at a temperature ranging from 150 to 350° C., preferably from 220 to 320° C. in the presence of a basic compound such as sodium hydroxide, potassium hydroxide and sodium methylate. In general formula [I], $R^1$ and $R^2$ may be the same or different and represent a hydrogen atom or an alkyl group such as a methyl group, an ethyl group, a propyl group, an isopropyl group, a butyl group, a tert-butyl group, a sec-butyl group and an amyl group. The content of the 6-membered acid anhydride units represented by general formula [I] in the polymer is preferably an amount such that heat resistance can be improved, but the molt viscosity does not become too high. It is usually from 3 to 30% by weight, preferably from 5 to 25% by weight.

Like the thermoplastic resin (b), the acrylic resin (c) also may be compounded with well-known antioxidants such as hindered phenol type antioxidants, phosphorus-type antioxidants and sulfur-type antioxidants, weather-resisting agents such as ultraviolet absorbers and hindered amine-type light stabilizers, flame retardants, coloring agents, pigments, dyes, inorganic fillers and the like. The ultraviolet absorbers are preferably benzotriazole-type ultraviolet absorbers with high molecular weight from the viewpoints of removing their volatilization from the laminate and preventing the deterioration of a base such as a design layer and a backing layer. Specifically preferred is 2,2-methylenebis [4-(1,1,3,3-tetramethylbutyl)-6-(2H-benzotriazol-2-yl)phenol]. In general, the compounding amount is preferably 1000 ppm or more.

The resin layer (C) of the present invention is preferably a transparent layer. The resin layer (C) is preferably an outermost layer of the laminate. In such a case, a structure can be obtained that has a surface which is of excellent deep feeling due to high transparency, which is a feature of acrylic resins, when a surface of the substrate is seen from the side of the resin layer (C) of the structure.

The resin layers (B) and (C) are obtained by forming the thermoplastic resin (b) and the acrylic resin (c) into films by T-die extrusion forming or calender forming. From the viewpoints of thickness accuracy and surface smoothness of laminates to be obtained, preferred are extrusion forming in which a resin layer is formed while both surfaces of the resin layer are kept in contact with the surfaces of rolls and extrusion forming in which a resin layer is formed while both surfaces of the resin layer are kept in contact with the surfaces of metallic belts. The presence of foreign materials with a particle diameter not greater than 100 μm in a resulting resin layer will adversely affect the appearance of the resin layer or the printability to the resin layer. Therefore, for preventing the contamination of foreign materials during film formation, it is preferable to dispose a screen mesh made of metal or sintered ceramic in the pathway of a molten acrylic resin. From the viewpoint that clogging hardly occurs or that even if clogging occurs, the frequency of stopping the production process in order to remove the material clogging is low, it is preferable to use, for example, a rotary-type screen changer available from Gneuss GmbH, Germany. The use of the rotary-type screen changer can provide a resin layer substantially free of foreign materials with a particle diameter of not greater than 100 μm.

The thickness of the resin layer (B) comprising a thermoplastic resin is usually from 20 μm to 400 μm, preferably from 70 μm to 250 μm. The thickness of the resin layer (C) is usually from 10 μm to 300 μm, preferably from 30 μm to 150 μm. The thickness of the resin layers is measured with a micrometer.

The laminate of the present invention may be produced in any way as long as the resin layer (A), the resin layer (B) and the resin layer (C) are disposed in layers in this order. For example, it may be produced by multi-layer extrusion in which the resin layers (A), (B) and (C) are extruded simultaneously to laminate, or may be produced by laminating the resin layers separately prepared. Furthermore, the laminate can also be produced by extruding a resin layer into a film form, followed by laminating another layer to the resin layer immediately after the extrusion which is still in a heated state. It is also possible to bring both resin layers into contact with a surface of a roll or a surface of a belt immediately after the lamination.

In the present invention, preferred is a method in which the resin layer (B) and the resin layer (C) are laminated to form an acrylic resin layer and then the resulting acrylic resin layer is laminated to the resin layer (A). During these operations, the resin layer (A) is laminated onto the resin layer (B) of the acrylic resin layer. An adhesive is generally employed for the lamination of the resin layer (A) and the resin layer (B). The kind of such an adhesive is not particularly limited and generally known adhesives such as chlorinated polypropylenes and adhesives for dry lamination for film applications including those of polyester type, polyurethane type, polyacrylate type and the like can be employed. In such cases, the resin layer to which the adhesive is applied may be any of the resin layers (A) and (B).

In the lamination, it is desirable that a surface of the resin layer (A) to which an adhesive will be applied and with which an adhesive will be brought into contact is subjected in advance to a corona discharge treatment at a corona discharge density of from 75 to 150 W·min/m² or ozone is blown in advance to a surface of the resin layer (A) which will be laminated under pressure to the resin layer (B). The temperature of the resin layer (A) that will be subjected to the treatment of blowing ozone is from 180° C. to 340° C., preferably from 220° C. to 320° C., more preferably from 250° C. to 300° C.

In the laminate of the present invention, an additional resin layer may be disposed in addition to resin layers (A), (B) and (C) unless the object of the present invention is affected.

Next, the substrate in the structure of the present invention is explained. The substrate comprises a polyolefin resin. By the "polyolefin resin" used herein are meant homopolymers and copolymers of α-olefins such as ethylene and propylene; copolymers of α-olefins and other monomers, the copolymers mainly comprising repeating units derived from α-olefins; mixtures of the aforementioned homopolymers and copolymers; mixtures of the foregoing homopolymers, copolymers or mixtures thereof and modifiers (elastomers, fillers and the like) wherein the mixture can be formed by methods known in the field of forming of thermoplastic resins such as injection molding, extrusion forming, blow molding and the like.

The polyolefin resins include polyethylene resins; polypropylene resins; polybutene; poly-4-methyl-pentene-1; copolymers obtained by copolymerizing at least two kinds of monomers selected from α-olefins having at least three carbon atoms and ethylene; and mixtures of foregoing resins and styrene-based elastomers, inorganic fillers or the like.

The α-olefins having at least three carbon atoms include α-olefins having from 3 to 20 carbon atoms such as propylene, butene-1, pentene-1, hexene-1, octene-1, decene-1 and octadecene-1.

The copolymers obtained by copolymerizing at least two kinds of monomers selected from the α-olefins having at least three carbon atoms described above and ethylene include propylene-ethylene block copolymers and propylene-ethylene-butene-1 block copolymers.

By the polyethylene resin mentioned above are meant homopolymers of ethylene; copolymers of ethylene and at least one monomer selected from α-olefins having at least three carbon atoms and other monomers wherein the copolymers mainly comprise repeating units derived from ethylene; and mixtures of these homopolymers and copolymers.

Examples of the polyethylene resin include low density polyethylene produced by radical polymerization, high density polyethylene produced by ion polymerization, and ethylene-α-olefin copolymers produced by copolymerizing ethylene and α-olefin by known radical polymerization or ion polymerization. Examples of the α-olefin include α-olefins having from 3 to 18 carbon atoms such as propylene, butene-1,4-methyl-pentene-1, hexene-1, octene-1, decene-1, octadecene-1, etc. These α-olefins may be employed singly or in combination of two or more of them. The content of the α-olefin is usually from 5% by weight to 98% by weight.

By the polypropylene resin mentioned above are meant homopolymers of propylene; copolymers of propylene and at least one monomer selected from ethylene, α-olefins having 4 or more carbon atoms and other monomers wherein the copolymers mainly comprise repeating units derived from propylene; and mixture of these homopolymers and copolymers.

Examples of the polypropylene resin include homopolymers of propylene and propylene-α-olefin copolymers such as propylene-ethylene copolymers, propylene-butene-1 copolymers, propylene-ethylene-butene-1 terpolymers. The α-olefin that can be copolymerized with propylene is exemplified by the α-olefins listed above. Two or more kinds of α-olefins may be copolymerized. The method for producing the polypropylene resin is not particularly limited. For example, it can be produced ion polymerization.

The polyolefin resin is preferably a resin composition mainly comprising a polypropylene resin from the viewpoint of obtaining a structure with a low molding shrinkage. Preferred are polyolefin resins having a coefficient of linear expansion measured at a temperature of from 20° C. to 100° C. of $1.0 \times 10^{-4}$ (1/° C.). In order to obtain a resin composition that mainly comprises a polyolefin resin and has a low molding shrinkage, the polyolefin resin may contain from 5% by weight to 40% by weight of an inorganic filler such as talc.

The structure of the present invention contains the laminate described above and a substrate comprising a polyolefin resin composition and the substrate is laminated to the resin layer (A) of the laminate. The method for producing such a structure is not limited to the following one, but a method can be adopted, the method comprising first preforming a laminate by thermoforming, inserting the preformed laminate into a mold, and thereafter injection molding a polyolefin resin, thereby attaching the resin layer (A) of the laminate to the polyolefin resin. The thermoforming includes vacuum forming, air pressure forming, vacuum-pressure forming, etc. Specifically, a method can be employed, the method comprising forming a laminate with a vacuum forming device so that the laminate fits to the configuration of a mold for injection molding, subsequently bringing the three-dimensional, vacuum-formed laminate into intimate contact with the inner surface of the cavity of the mold for injection molding so that the resin layer (C) comes into contact with the inner surface of the cavity, closing the mold, and thereafter injection molding a polyolefin resin, thereby laminating the resin layer (A) of the laminate to the polyolefin resin.

For example, it is also possible to laminate a surface of the laminate to a surface of a substrate with direct contact by a method comprising steps of providing an injection molding device equipped with a mold with which in-mold processing can be achieved, bringing the film into intimate contact with the inner surface of the cavity of a mold for injection molding equipped with a device for heating the film and a device for sucking the film (e.g., a vacuum pump) so that the resin layer (C) of the film comes into contact with the inner surface of the cavity, and injection molding a polyolefin resin composition. Another possible way comprises forming a substrate by extrusion of a molten and plasticated polyolefin resin composition through a die or injection of that resin composition into a mold comprising a pair of a male and female dies, and subsequently attaching at least a part of a surface of the substrate to a surface of a laminate with direct contact while holding the laminate and the substrate in a relation such that the surface of the resin layer (A) of the laminate comes into contact with the surface of the substrate.

The structure of the present invention is not limited as to its shape. For example, it may have a shape like automotive exterior parts or a shape like parts of household appliances. Further, it has a shape like a signboard. The shape of the structure may be determined suitably according to applications of the structure.

If a resin composition containing from 10 to 98% by weight of a propylene polymer, from 1 to 60% by weight of an inorganic filler and from 1 to 60% by weight of a rubber component is used as the resin layer (A) in the laminate of the present invention, it is possible to hold the design property of the surface of its substrate for a long period of time because of excellent adhesiveness of the resin composition with the substrate comprising a polyolefin resin.

The surface (designed surface) of the structure of the present invention is excellent in transparency and surface luster property and can have a 60° specular gloss of 80% or more, preferably 90% or more because it has a resin layer (C) (transparent layer) comprising an acrylic resin. The 60° specular gloss can be determined by a method provided in JIS-K-7105. The greater the value, the better the design property.

In order to replace the conventional structures that require a painting step, the laminate structure of the present invention is required to have not only good appearance but also scratch resistance indicated by pencil hardness. The laminate structure of the present invention can have a pencil hardness of B or more, particularly 2H or more, especially 4H or more by use of an acrylic resin (c) with good scratch resistance for the resin layer (C).

As described above, the structure of the present invention can be a structure with high-quality appearance that has an excellent scratch resistance as well as good surface design property.

The structure of the present invention is suitable for various applications such as automotive parts (e.g., automotive interior or exterior parts), parts of household appliances, parts of sundries, signboards, etc, because of its characteristics described previously. Particularly, when the laminate structure of the present invention is used for automotive parts, parts of household appliances, or the like, such parts can be produced at low cost because no painting step is required for the purpose of imparting the parts design property. When the structure of the present invention is employed for signboards, the structure can be stamped out along free curves because the structure uses a polyolefin resin composition of high toughness as a substrate.

EXAMPLES

The present invention is described based on Examples below, but the invention is not limited to the Examples.

Example 1

Resin Layer A

Resin layer (A) was prepared by feeding a propylene-ethylene copolymer (PP1) (Sumitomo Noblene (registered trademark), MFR (230° C., 2.16 kg load) 1.5 g/10 min, ethylene content 5% by weight) into a T-die film processing device and was subjected to extrusion forming at a cylinder temperature of 260° C. The resulting resin layer (A) had a thickness of 200 μm.

(Resin Layer (B) [Design Layer]/Resin Layer (C) [Transparent Layer])

A polycarbonate resin (manufactured by Sumitomo Dow Ltd., Calibre 302-10) was used as the thermoplastic resin (b-1) to be used for resin layer (B). The resulting thermoplastic resin (b-1) was measured for its tensile elongation at break according to the tensile test of hard plastics provided in JIS K7113 (dimensions of test piece: 12.3 mm×127 mm×3 mm, test temperature 23° C.) and was found to have a tensile elongation at break of 120%.

Next, colored (silver) pallets for a design layer were obtained by melt-kneading 97.99 parts by weight of pellets of thermoplastic resin (b-1), 2 parts by weight of aluminum powder (manufactured by Toyo aluminum Co., Ltd., Average particle size 38 μm) and 0.01 part by weight of Titanium Yellow dye at a resin temperature of 265° C. using a 40 mm single screw extruder manufactured by Tanabe Plast Kikai KK.

Pellets of an acrylic resin (reduced viscosity 0.08 L/g, methyl methacrylate units 94% by weight, methyl acrylate units 6% by weight) produced by bulk polymerization were used as the acrylic resin (c-1) to be used for resin layer (C). In the pellets, 0.5 part by weight of Adeca Stab-LA31 (manufactured by Asahi Denka Co., Ltd.) was added as a benzotriazole ultraviolet absorber.

The acrylic resin (c-1) and the colored thermoplastic resin (b-1) were, respectively, molten with two single screw extruders (temperature of the extruders: 260° C.) and were extruded through a T-die (temperature set: 280° C.) while being sequentially laminated with a feed block (temperature set: 280° C.). Using a set of forming rolls comprising three polishing rolls (roll temperature: 70° C.), the extruded molten resin was cooled by pressing in such a manner that a first and second rolls were kept in contact with the molten resin from both sides of the extrudate. Thereby obtained was an acrylic resin layer of a constitution of [Resin layer (C) (transparent layer)]/[Resin layer (B) (design layer)]. The thickness of individual layers in the resulting resin layer is as follows: resin layer (C): 100 μm; resin layer (B): 200 μm.

Adhesive for Lamination of Resin Layer (A) and Acrylic Resin Layer

An adhesive was prepared by diluting a mixture of 100 parts by weight of polyurethane adhesive TKS3989 (manufactured by Toyo-Morton, Ltd.) and 4 parts by weight of isocyanate hardener CAT-RT (manufactured by Toyo-Morton, Ltd.) with toluene as a dilution solvent. The adhesive was used in such a manner that the application amount thereof becomes 7 g/m² after drying.

Lamination of Resin Layer (A) and an Acrylic Resin Layer

A predetermined amount of the aforementioned adhesive was applied to the resin layer (B) of the acrylic resin layer and was dried at 80° C. for about 1 minute. This resin layer (B) and a corona-treated surface of resin layer (A) were laminated with a laminate roll set at 90° C. After that, aging was carried out at 40° C. for 72 hours, yielding a laminate.

Preforming of Laminate

Using a vacuum forming device (CUPF1015-PWB, manufactured by Fu-Se Vacuum Forming), the resulting laminate was fixed in a heating zone and both surfaces of the laminate were heated with a far infrared heater until the temperature of the surfaces reached 180° C. Subsequently, the laminate was brought into contact with a mold and was formed by vacuuming the air present between the mold and the laminate. After cooling and solidifying the laminate with an air blower, the laminate preformed (preformed article) was removed. The shape of the resulting preformed article is shown in FIG. 1.

Evaluation of Crack Resistance

The ease of a laminate to form cracks at the time of its setting in its vacuum forming or its releasing from a mold after its vacuum forming was evaluated according to the following criteria including 4 ranks. The results are shown in Table 1.

4: No cracks are formed.

3: Little cracks are formed.

2: Cracks may be formed.

1: Cracks are formed very easily.

Evaluation of Curl

A preformed article performed into a three-dimensional shape by vacuum forming was trimmed along the shape of a predetermined product. After the preformed article was left to stand at a flat place for one week, the amount of curl thereof was measured. The amount of curl was calculated from a formula:

[The length of a part of a mold, the part corresponding to a size measurement part (A-A') of the preformed article shown in FIG. 1]–[The length between A-A' in the preformed article shown in FIG. 1]

Subsequently, a structure was produced using the preformed article and the appearance of the resulting structure was observed visually. The result is shown in Table 1.

A laminate was prepared in the same manner as Example 1 except for using, as resin layer (B), a thermoplastic resin (b-2) (tensile elongation at break: 90% (according to JIS K7113)) obtained by mixing 40 parts by weight of pellets of an acrylic polymer (reduced viscosity: 0.06 L/g; methyl methacrylate units: 95% by weight; methyl acrylate units: 5% by weight) produced by bulk polymerization, 40 parts by weight of acrylic polymer fine particles having three-layer structure [innermost layer: a crosslinked polymer made up of 37.5 parts by weight of methyl methacrylate and 0.075 part by weight of diallyl maleate; intermediate layer: a soft rubber elastic body made up of 38.5 parts by weight of butyl acrylate, 9 parts by weight of styrene and 0.95 part by weight of dially maleate; outermost layer: an acrylic polymer comprising a copolymer made up of 14.4 parts by weight of methyl methacrylate and 0.6 part by weight of ethyl acrylate (see Example 3 described in Japanese Patent Examined No 55-27576); average particle size: about 300 nm], 20 parts by weight of beads of an acrylic resin (reduced viscosity: 0.06 L/g; methyl methacrylate units: 90% by weight; methyl acrylate units: 10% by weight) produced by suspension polymerization with a tumbler mixer, melt-kneading and palletized the mixture with a twin screw extruder. Vacuum forming and evaluation of formability, crack resistance and the amount of curl of a preformed article were performed in the same manner as Example 1. A structure was produced using the preformed article and the appearance of the resulting structure was observed visually. The result is shown in Table 1.

Example 2

A laminate was prepared in the same manner as Example 1 except for using, as resin layer (A), a resin composition comprising 27 parts by weight of a mixture (PP2) (Sumitomo Noblene (registered trademark); MFR (230° C., 2.16 kg load): 0.5 g/10 min; the amount of low density polyethylene: 15% by weight) made up of a propylene homopolymer and a low density polyethylene, 30 parts by weight of ethylene-butene copolymer (EBR-1) (Esblene SPO N0416 (registered trademark); MFR (230° C., 2.16 kg load): 13 g/10 min; butene content: 22% by weight) and 43 parts by weight of a talc masterbatch (Talc JR46 (manufactured by Hayashi Chemical Industry Co., Ltd.): 70% by weight; homopolypropylene (PPMB) (MFR 120 g/10 min): 30% by weight). Vacuum forming and evaluation of formability, crack resistance and the amount of curl of a preformed article were performed in the same manner as Example 1. A structure was produced using the preformed article and the appearance of the resulting structure was observed visually. The result is shown in Table 1

TABLE 1

| | Example 1 | Comparative Example 1 | Example 2 |
|---|---|---|---|
| Resin layer (A) (% by weight) | PP1: 100 | PP1: 100 | PP2: 27<br>PPMB: 13<br>EBR1: 30<br>Talc: 30 |
| Resin layer (B) | (b-1) | (b-2) | (b-1) |
| Tensile elongation at break (MPa) | 130 | 90 | 130 |
| Resin layer (C) | (c-1) | (c-1) | (c-1) |
| Crack resistance | 4 | 1 | 4 |
| Amount of curl (mm) | 17 | 19 | 0 |
| Appearance of structure | Good | Poor | Good |

As described above, in the present invention, using, as resin layer (B), a resin composition having a specific tensile elongation at break as makes it possible to obtain a laminate which exhibits excellent crack resistance at the time of performing. Since no cracks are formed when the laminate of the present invention is preformed, a structure can be obtained when a structure is produced using the laminate of the present invention.

Further, in the laminate of the present invention, using, as resin layer (A), a propylene resin composition comprising a propylene resin containing an inorganic filler and a thermoplastic elastomer makes it possible to prevent a laminate from curling at the time of thermoforming such as vacuum forming.

What is claimed is:

1. A laminate comprising at least:
    a resin layer (A) containing a propylene-based resin (a), an inorganic filler and a thermoplastic elastomer;
    a resin layer (B) containing a thermoplastic resin (b) having a tensile elongation at break of not less than 100%; and
    a resin layer (C) containing an acrylic resin (c), wherein the resin layer (A), the resin layer (B) and the resin layer (C) are disposed in layers in this order.

2. The laminate according to claim 1, wherein the thermoplastic resin (b) is a polycarbonate resin.

3. The laminate according to claim 1 or 2, wherein the resin layer (B) is a design layer and the resin layer (C) is a transparent layer.

4. The laminate according to claims 1 or 2, wherein the resin layer (C) is an outermost layer.

5. The laminate according to claims 1 or 2, wherein the resin layer (A) comprises from 10 to 98% by weight of the propylene-based resin (a), from 1 to 60% by weight of an inorganic filler and from 1 to 60% by weight of a thermoplastic elastomer.

6. The laminate according to claim 5, wherein the thermoplastic elastomer is an ethylene-α-olefin copolymer.

7. The laminate according to claim 5, wherein the inorganic filler is talc.

8. A structure comprising the laminate according to claims 1 or 2 and a substrate containing a polyolefin resin, the substrate being laminated to the resin layer (A) of the laminate.

9. A process for producing a structure, the process comprising: preforming the laminate according to claims 1 or 2 by thermoforming;
    inserting the laminate preformed into a mold; and
    injection-molding, after the insertion, a polyolefin resin, thereby laminating the resin layer (A) of the laminate to the polyolefin resin.

10. An automotive part comprising the structure according to claim 8.

11. A part of household appliances, the part comprising the structure according to claim 8.

12. The laminate according to claim 3, wherein the resin layer (C) is an outermost layer.

13. The laminate according to claim 3, wherein the resin layer (A) comprises from 10 to 98% by weight of the propylene-based resin (a), from 1 to 60% by weight of an inorganic filler and from 1 to 60% by weight of a thermoplastic elastomer.

14. The laminate according to 4, wherein the resin layer (A) comprises from 10 to 98% by weight of the propylene-based resin (a), from 1 to 60% by weight of an inorganic filler and from 1 to 60% by weight of a thermoplastic elastomer.

15. A structure comprising the laminate according to claim 3 and a substrate containing a polyolefin resin, the substrate being laminated to the resin layer (A) of the laminate.

16. A structure comprising the laminate according to claim 4 and a substrate containing a polyolefin resin, the substrate being laminated to the resin layer (A) of the laminate.

17. A structure comprising the laminate according to claim 5 and a substrate containing a polyolefin resin, the substrate being laminated to the resin layer (A) of the laminate.

18. A structure comprising the laminate according to claim 6 and a substrate containing a polyolefin resin, the substrate being laminated to the resin layer (A) of the laminate.

19. A structure comprising the laminate according to claim 7 and a substrate containing a polyolefin resin, the substrate being laminated to the resin layer (A) of the laminate.

20. A process for producing a structure, the process comprising: preforming the laminate according to claim 3 by thermoforming;

inserting the laminate preformed into a mold; and injection-molding, after the insertion, a polyolefin resin, thereby laminating the resin layer (A) of the laminate to the polyolefin resin.

21. A process for producing a structure, the process comprising: preforming the laminate according to claim 4 by thermoforming;

inserting the laminate preformed into a mold; and injection-molding, after the insertion, a polyolefin resin, thereby laminating the resin layer (A) of the laminate to the polyolefin resin.

22. A process for producing a structure, the process comprising: preforming the laminate according to claim 5 by thermoforming;

inserting the laminate preformed into a mold; and injection-molding, after the insertion, a polyolefin resin, thereby laminating the resin layer (A) of the laminate to the polyolefin resin.

23. A process for producing a structure, the process comprising: preforming the laminate according to claim 6 by thermoforming;

inserting the laminate preformed into a mold; and injection-molding, after the insertion, a polyolefin resin, thereby laminating the resin layer (A) of the laminate to the polyolefin resin.

24. A process for producing a structure, the process comprising: preforming the laminate according to claim 7 by thermoforming;

inserting the laminate preformed into a mold; and injection-molding, after the insertion, a polyolefin resin, thereby laminating the resin layer (A) of the laminate to the polyolefin resin.

* * * * *